United States Patent [19]

Szarewicz et al.

[11] 4,161,654
[45] Jul. 17, 1979

[54] CAROUSEL-TYPE COMPONENT DISPENSER WITH PHOTOELECTRIC CONTROL MEANS

[75] Inventors: Thomas D. Szarewicz, East Lansdowne; John H. Drinkard, Jr., Exton, both of Pa.

[73] Assignee: Burroughs Corporation, Detroit, Mich.

[21] Appl. No.: 862,659

[22] Filed: Dec. 20, 1977

[51] Int. Cl.² .......................................... G01D 21/04
[52] U.S. Cl. .................................. 250/221; 250/223 R
[58] Field of Search .............. 250/221, 222 R, 223 R; 340/556

[56] References Cited

U.S. PATENT DOCUMENTS 4,104,518 8/1978 Schachinger et al. ............... 250/221

Primary Examiner—David C. Nelms
Assistant Examiner—Darwin R. Hostetter
Attorney, Agent, or Firm—Mark T. Starr; Edmund M. Chung; Kevin R. Peterson

[57] ABSTRACT

An improvement to carousel-type component dispensers which eliminates the requirement of operator intervention in order to access the next component required in the assembly of a work piece. Each time the operator inserts his hand in the dispenser to remove a component, he interrupts a light beam which triggers the dispenser's indexing mechanism to position itself for the next position of rotation. When the operator removes the component, the light beam path is restored and a light activated detector signals the dispenser's rotation mechanism to rotate the dispenser to the position specified by the indexing mechanism.

The apparatus includes time delay circuitry which prevents the carousel from rotating while the operator's hand is in the carousel accessing a component.

7 Claims, 2 Drawing Figures

CAROUSEL-TYPE COMPONENT DISPENSER WITH PHOTOELECTRIC CONTROL MEANS

BACKGROUND OF THE INVENTION

This invention relates in general to component dispensers used in assembly line production and more particularly to an improvement to carousel-type component dispensers.

The design of carousel-type component dispensers is well known in the prior art. Most of the prior art component dispensers are controlled by a manually activated air switch which requires the operator to depress a button each time he requires the next component called for in the assembly of a work piece. The drawback of such control mechanisms is that they require the operator to be aware of which dispenser position was last selected. Hence, when distracted or when returning to his work, the operator can forget whether the component selection presently available is the one required or whether the component dispenser requires advancement to the next position.

It is an object of the present invention to eliminate these and other drawbacks of the prior art by providing an improved means of controlling the rotation of a carousel-type component dispenser.

It is a further object of the present invention to provide a control mechanism for a carousel-type component dispenser which automatically advances the carousel to the next position each time a component is removed from the carousel.

It is still another object of the present invention to provide a light activated switching apparatus to control the sequencing of a component dispenser.

These and other objects, features and advantages of the present invention will become more apparent from the detailed description of the preferred embodiment when read in conjunction with the drawings.

SUMMARY OF THE INVENTION

According to the invention, an improvement to the sequencing control of a carousel-type component dispenser is provided to minimize the possibilities of an operator forgetting to rotate the dispenser to access the next component required in the assembly of a work piece or rotating the dispenser past the next required position. In addition, the present invention minimizes the possibility of operator injury by preventing carousel rotation while the operator's hand is near the carousel.

It will be seen that with such a carousel-type component dispenser, the operator removes components from the dispenser and inserts them in a workpiece. In the preferred embodiment of the present invention, a removal area in front of the carousel provides a reference frame to identify the position from which a component is to be removed after each sequencing of the carousel rotation mechanism. Positioned at the top and bottom of the removal area are a light sensitive transistor and a light source, respectively. As the operator inserts his hand to remove a component, his hand interrupts the light path between the light source and the light sensitive transistor. The light sensitive transistor detects the interruption of the light path and signals the control circuitry to activate an electric air valve, which when activated engages the carousel's indexing mechanism to reference the next position of carousel rotation. When the operator removes the component from the carousel, the light path restoration is detected by the light sensitive transistor and the control circuitry deactivates the air valve, which when deactivated engages the carousel's rotation mechanism so that the carousel rotates to the next indexed position.

The control circuitry includes a time delay which prevents temporary restorations of the light path from triggering the carousel's rotation mechanism. As a result, light momentarily passing through the operator's fingers as he removes a component will not cause the carousel to rotate to the next indexed position.

DETAILED DESCRIPTION OF THE PREFERRED EMBODIMENT

Figure 1:
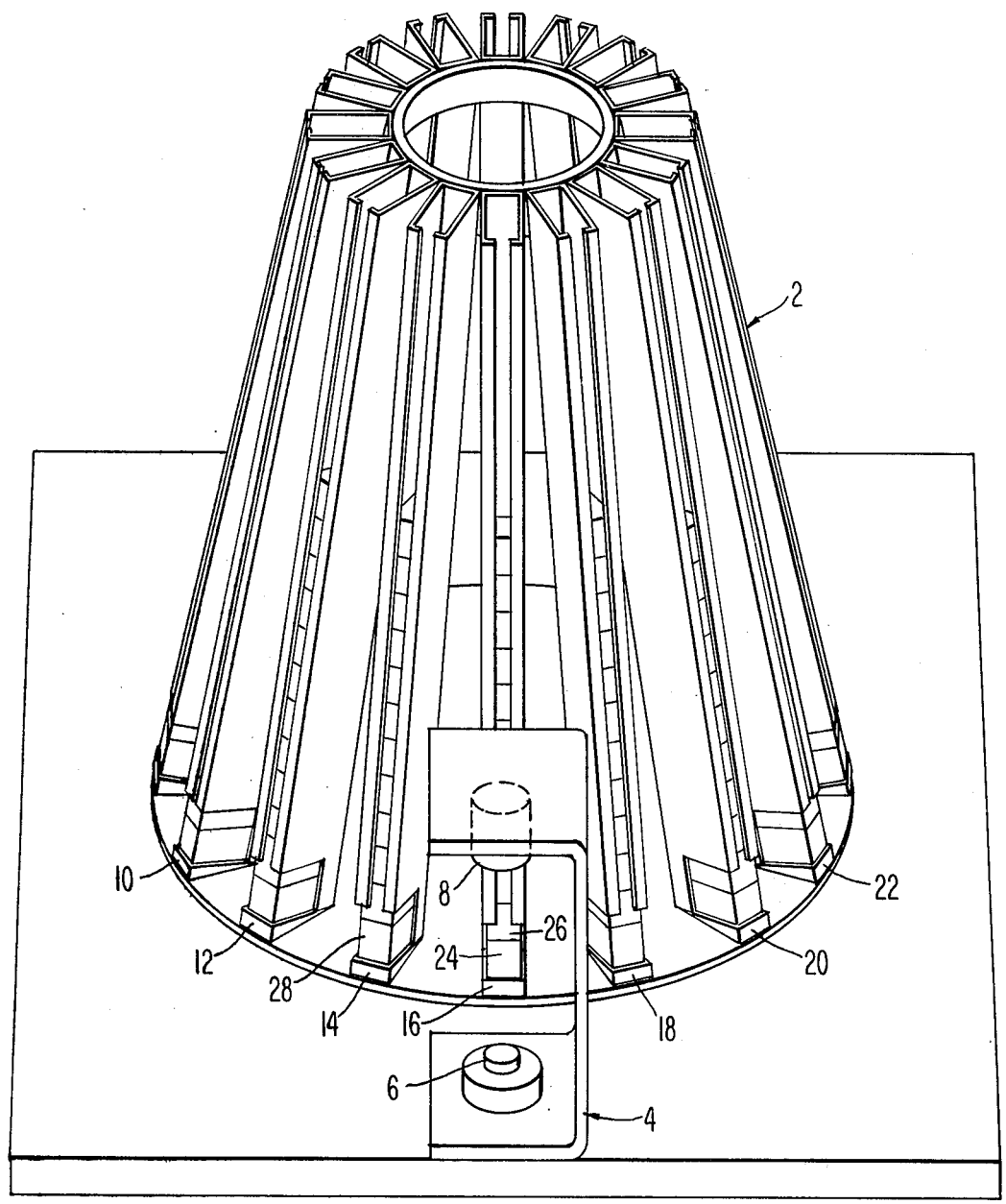
FIG. 1 illustrates the location of the light source and light detection means in the preferred embodiment of the present invention.

FIG. 1 illustrates a carousel-type component dispenser 2 and the improvement to said dispenser 2 embodied in the present invention.

The design of such a dispenser 2 is well known in the prior art. In the prior art dispenser 2, components 24–28, i.e., integrated circuits, are held in dispenser tubes 10–22 and the dispenser tubes 10–22 are loaded on the carousel 2. The order in which the dispenser tubes 10–22 are loaded on the carousel 2 is such that the dispenser tube 16 presently located in front of the operator contains the component 24 necessary for the present step in the assembly of a work piece. Rotating the carousel to the next position brings the then appropriate dispenser tube 14 into position in front of the operator so that the operator can access the next component 28 required in the assembly of the work piece. This establishes a continuous movement which is in synchronization with the required steps in the assembly of the work piece.

In the prior art dispenser, the carousel 2 is manually rotated to the first required selection of a component 24; that is, so that dispenser tube 16 is located in front of the operator. The operator removes the component 24 from dispenser tube 16 and installs the component 24 in his work piece. In order to access the next required component 28, the operator either manually rotates the carousel 2 so that dispenser tube 14 is in front of him or activates a mechanically operated switch. In the latter case, the switch activates either an electro-mechanical or air operated rotation mechanism which rotates the carousel to position dispenser tube 14 in front of the operator. Various designs for the rotation mechanism are available and would be obvious to those skilled in the art.

In the preferred embodiment of the present invention, as shown in FIG. 1, the mechanically operated switch of the prior art is replaced with a light source 8 and a photo transistor 6 positioned on the top and bottom respectively, of removal station 4 such that the operator's hand must interrupt the light beam generated by light source 8 when he removes a component 24 from dispenser tube 16.

Figure 2:
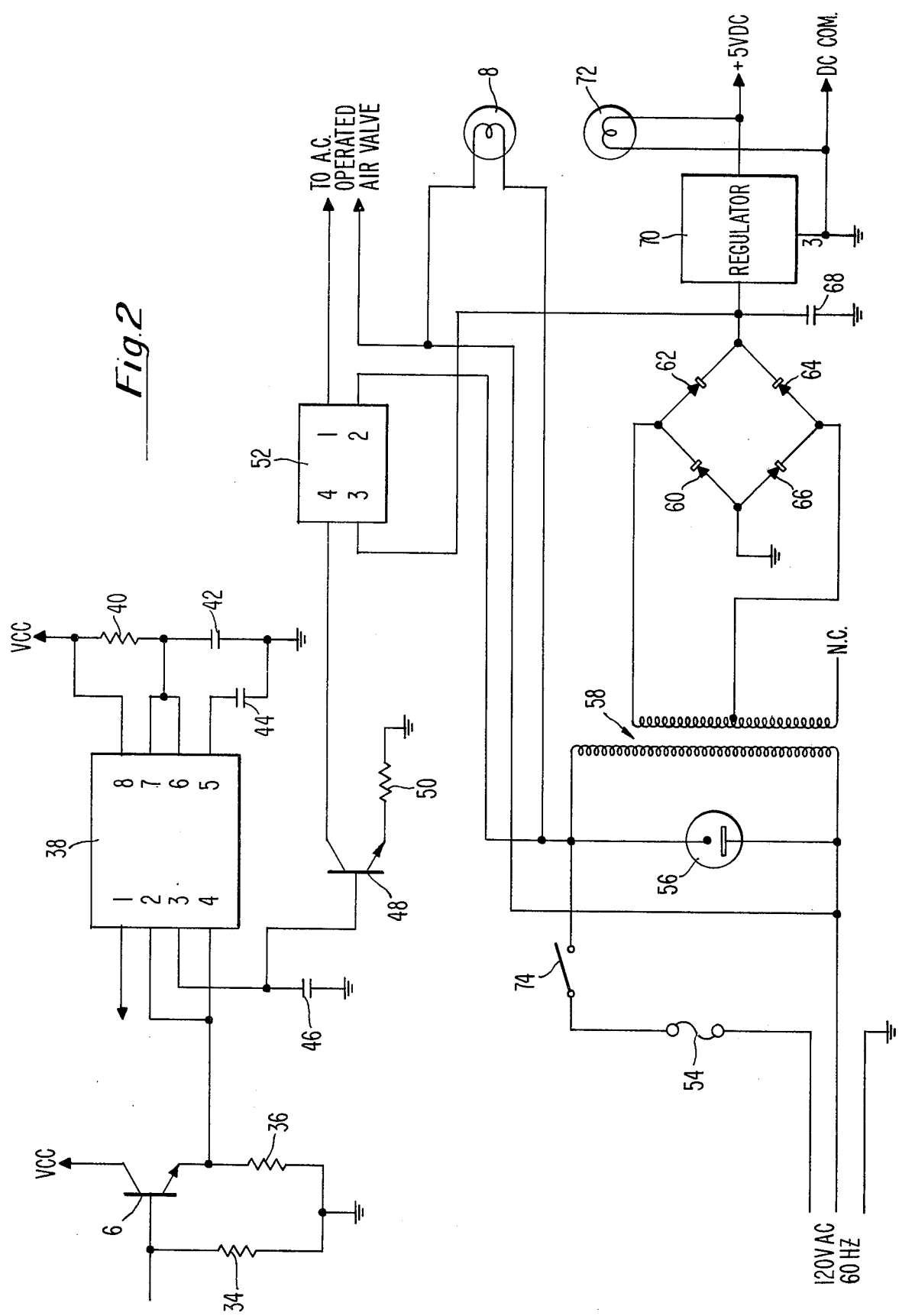
FIG. 2 is a schematic illustrating the control circuit of the present invention.

The photo transistor 6 is a component in the control circuit shown in FIG. 2. The control circuit's basic components are a photo transistor 6, a timer 38, a control transistor 48, and a solid state relay 52. In the preferred embodiment, a Fairchild FPT 130 light sensitive transistor, a Signetics NE555 IC timer, a 2N3107 NPN low power transistor and GE GSR10AU10 solid state relay are utilized, respectively. However, it would be obvious to those skilled in the art that equivalent components may be utilized.

Initially, the light source 8 is applied to the lens of photo transistor 6. When the light source 8 is removed, viz., blocked out, the photo transistor 6, which is conducting initially, turns off. Emitter follower action produces a negative going voltage at the input pin of timer 38 and causes the output pin of timer 38 to go high. This voltage is fed to the base of control transistor 48 causing it to conduct. The solid state relay 52 is in the collector circuit of control transistor 48 and is turned on when the control transistor 48 is conducting. The solid state relay 52 applies an AC voltage to an electrically operated air valve, the operation of which will be explained below.

In the preferred embodiment of the subject invention, the timer 38 is set at approximately 0.5 seconds to insure that once the light source 8 is removed, additional applications of the light source 8 for intermittent periods, i.e., light passing through the operator's fingers, will not cause the solid state relay 52 to turn off. The timing period may be adjusted by selection of RC times in the timing control circuit of timer 38.

Operation of the carousel dispenser 2, including the control circuit of FIG. 2, is as follows. The carousel 2 is manually rotated to the first required position for selection of a component; viz., the carousel 2 is manually rotated so that dispenser tube 16 is positioned behind removal station 4. When the operator removes the component 24 from dispenser tube 16, his hand passes between the light source 8 and the photo transistor 6 positioned on removal station 4, interrupting the light beam generated by light source 8. As explained previously, the interruption of the light beam results in the solid state relay 52 switching in an AC voltage across its output terminal. The AC output of the solid state relay 52 is connected to an electrically operated air valve. The application of the AC voltage to the air valve activates the air valve which in turn operates an air shuttle which operates the indexing mechanism of the carousel 2. The indexing mechanism is moved to pick up an indexing post on the underside of the carousel 2. The indexing mechanism holds this position until the next phase in the cycle.

When the operator removes the component 24 from dispenser tube 16, his hand ceases to interrupt the light path between the light source 8 and photo transistor 6. As previously explained after the light path is restored, timer 38 will prevent solid state relay 52 from turning off for a time dependent on the RC timing control circuit of timer 38. However, once this time expires, the solid state relay 52 will turn off, resulting in the removal of the AC output of solid state relay 52. The removal of the AC output of solid state relay 52 causes the electrically operated air valve to close and the indexing mechanism connected to the air valve completes its cycle by pushing the index post to the referenced position, causing the carousel 2 to rotate to position dispenser tube 14 behind the removal station 4.

Since the carousel 2 rotation occurs automatically each time the operator removes a component from the dispenser tube positioned behind removal station 4, the component required for the next step in the assembly of the work piece is always the one positioned in the dispenser tube behind the removal station 4.

Having shown and described a preferred embodiment of the invention, those skilled in the art will realize that various omissions, substitutions and changes in the forms and details of the apparatus illustrated and its operation may be made without departing from the spirit of the invention. It is the intention, therefore, to be limited only as indicated by the scope of the following claims.

What is claimed is:

1. An apparatus for dispensing components in the order required for the assembly of a work piece, comprising:
   a rotatable carousel for storing sequentially prearranged components;
   means for indexing said carousel to the next desired position of rotation, said position corresponding to the location on said carousel of the next component required for the assembly of said work piece;
   means for rotating said carousel to the position specified by said indexing means;
   means for providing a detectable energy beam;
   means for detecting the presence of said energy beam, said detecting means switching from a first state to a second state in response to the non-detection of said energy beam;
   a source of electrical power;
   means responsive to the application of said source of electrical power for activating said indexing means, said activation means further responsive to the removal of said source of electrical power for activating said rotating means; and
   means connected to said detecting means, said source of electrical power and said activation means, for applying said source of electrical power to said activation means when said detecting means is in the second state and for removing said source of electrical power to said activation means when said detecting means is in the first state.

2. The apparatus of claim 1 wherein said means for providing said detectable energy beam is a light source and said detecting means is a light sensitive transistor.

3. The apparatus of claim 1 wherein said means for providing said detectable energy beam is positioned such that the energy beam irradiates said detecting means.

4. The apparatus of claim 3 wherein said means for providing said detectable energy beam and said detecting means are positioned such that the action of an operator in removing one of said components from said carousel will block the energy beam from irradiating said detecting means.

5. The apparatus of claim 1 further comprising means connected between said detecting means and said power application means and responsive to said detecting means being in the second state, for delaying said power application means from detecting the transition of said detecting means from the second state to the first state.

6. The apparatus of claim 5 wherein the time delay introduced by said delay means is variable.

7. The apparatus of claim 1 wherein said activation means comprises an electrically operated air valve, whereby said indexing means is engaged in response to the activation of said air valve and said rotating means is engaged in response to the deactivation of said air valve.

* * * * *